(No Model.)
M. H. BARKER.
SHAFT BEARING.
No. 593,188. Patented Nov. 9, 1897.
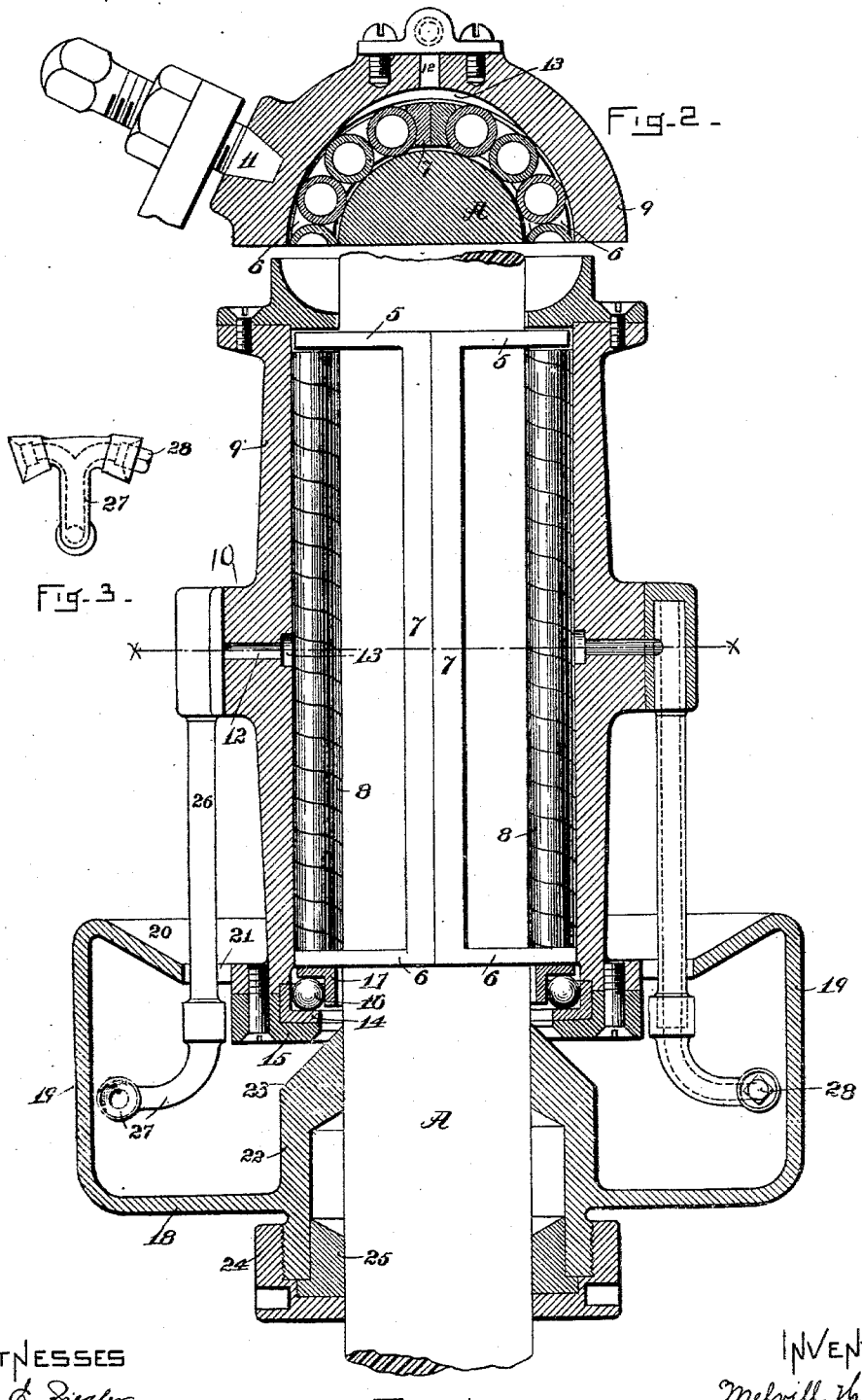
WITNESSES
INVENTOR
Melvill H. Barker
by Henry J. Miller
atty.

UNITED STATES PATENT OFFICE.

MELVILL H. BARKER, OF BOSTON, MASSACHUSETTS.

SHAFT-BEARING.

SPECIFICATION forming part of Letters Patent No. 593,188, dated November 9, 1897.

Application filed May 10, 1897. Serial No. 635,762. (No model.)

*To all whom it may concern:*

Be it known that I, MELVILL H. BARKER, of Boston, in the county of Suffolk and State of Massachusetts, have invented certain new and useful Improvements in Shaft-Bearings; and I hereby declare that the following is a full, clear, and exact description of the same, reference being had to the accompanying drawings, forming part of this specification.
This invention has reference to improvements in shaft-bearings, and relates particularly to means for reducing the friction between the shaft and its bearings and for lubricating the same.
The object of the invention is to so construct a shaft-bearing in which antifriction-rolls are used that the torsional friction between the rolls, the casing, and the shaft is reduced to a minimum.
Another object is to improve the construction of an antifriction-bearing in which parallel antifriction-rolls are supported in a cage.

Another object of the invention is to provide a bearing of this nature with a lubricating device whereby a constant flow of lubricant may be maintained to the bearing, the lubricant being continuously raised and delivered to the bearing after its passage down the shaft.
Another object of the invention is to improve the construction of centrifugal lubricators with special reference to vertical shafts.

The invention consists in the peculiar construction of the bearing sleeve or casing, the raceway seated in the lower portion thereof, balls working therein, and the inverted annular raceway mounted on the balls, together with the cage supported on the inverted raceway and antifriction devices within the cage.
The invention also consists in the lubricant-reservoir fixed on the shaft and constructed to collect the lubricant as it passes down the shaft, the bearing-sleeve having a channel connecting its outer surface with a lateral recess in its inner surface and a supply-pipe connected with such channel and extending into the reservoir.

The invention also consists in the construction of the bearing sleeve or casing and its peculiar combination with the novel antifriction-bearing.

The invention also consists in the peculiar construction of the reservoir and its supply-pipe.

The invention also consists in such other novel features of construction and combination of parts which will hereinafter be more fully described, and pointed out in the claims.

Figure 1 represents a vertical sectional view of the improved combined bearing and lubricator. Fig. 2 represents a cross-sectional view of the same, taken on a line $x$ $x$, the bearing sleeve or casing being slightly rotated to bring into position one of the supporting-screws which may be used when the bearing is utilized as a bolster. Fig. 3 represents a plan view of the supply-pipe.

Similar numbers of reference designate corresponding parts throughout.

In shaft-bearings of this nature it is found in practice that by slight variations in parallelism between the shaft, the antifriction-rolls, and the casing a certain torsional resistance to the free action of the rolls is set up, particularly when the slightest inaccuracy exists in the contact between the ends of the rolls and the cage in which they are mounted. Again, it is necessary that a constant supply of lubricant be carried to the parts of the bearing, and economy requires that the lubricant be repeatedly used in the same bearing.

In the drawings, A represents the vertical shaft to which the bearing is to be applied, either adjacent to the step which supports the shaft or intermediate the length of the shaft, as a bolster-bearing.

Embracing the shaft is a two-part cage formed of the upper and lower semicircular rings 5 and 6, connected by vertical plates, as 7. This cage is of the ordinary construction, and between the plates 5 and 6 are the usual parallel antifriction-rolls 8 8.

The casing 9, corresponding to the usual bearing-sleeve, has an enlargement 10, on which the supporting and alining screws, as 11, may bear. Through this enlargement is formed one or more channels 12. Usually two are used, as shown, connecting with the recess or recesses 13, formed in the inner surface of the casing and extending laterally from the channel in order to supply several of the rolls with lubricant. At the lower end the casing 9 is furnished with an interior cutaway portion in which the upwardly-facing annular raceway 14 is seated, being secured and supported by the flange 15, secured to the casing in any manner and embracing the shaft, but out of contact therewith. On the raceway 14 is a series of balls 16, on which works the inverted raceway 17, free to revolve about the shaft on the balls and supporting the plates 6 of the roll-cage, which may or may not be attached thereto. I prefer that this raceway 17 shall be free from both the shaft and from the cage in order to effect the utmost independence of action under any resistance to the revolution of the cage.

Below the casing is mounted the reservoir 18, having the upwardly-extending circular wall 19, furnished with the dished reflector 20, between the edge of which and the lower portion of the casing is the annular opening 21. The reservoir is fixed to the shaft by means of the stuffing-box 22, the upper portion of which forms the conical member 23, and the cap 24, screwing onto the lower sleeve portion of the stuffing-box to force the follower 25 against the packing in the box.

Over the channel 12 in the casing is secured the upper end of the supply-pipe 26. This pipe extends down through the opening 21 and then curves outward toward the inner periphery of the lubricator-wall 19, where it is provided with the branch fitting 27, one opening in which is furnished with a screw-plug 28.

In operation the reservoir is supplied with a determined amount of lubricant upon the rotation of the shaft carrying the reservoir. The centrifugal action impels the lubricant toward the wall 19 of the reservoir, where a portion enters the opening in the fitting 27, the pressure from the centrifugal action being sufficient to force the lubricant up the supply-pipe through the channel 12 to the recess 13, where it collects and is supplied to the rolls 8 8 and from them to the shaft, thence passing down the shaft to the conical member 23, by which it is directed back into into the reservoir.

The deflector 20 prevents the escape of the lubricant under the sudden starting of the shaft, and its edge is free from interference with the supply pipe or pipes.

Having thus described my invention, I claim as new and desire to secure by Letters Patent—

1. In a shaft-bearing, the combination with a casing, an upwardly-facing raceway seated therein, a series of balls on the raceway, and an inverted raceway resting on the balls and independent of the shaft, of a cage supported by the inverted raceway, and a series of rolls contained within the cage and bearing on the inner surface of the casing.

2. In a shaft-bearing the combination with a casing having a circumferentially-extending recess in its inner surface and a channel connecting the recess with the outer surface of the casing, a roller-bearing contained within the casing, and an independent antifriction-bearing for supporting the roller-bearing, of a shaft journaled in the bearing, a reservoir embracing the shaft and fixed thereto, and a supply-pipe connected with the channel in the casing, and extending into the reservoir.

3. In a shaft-bearing, the combination with a shaft, and a casing having a channel extending through its wall, of a reservoir having a stuffing-box embracing the shaft, a peripheral wall, and a dished deflector extending inward from said wall toward the casing, and a supply-pipe connected with the channel in the casing and extending downward between the casing and the edge of the deflector, and then outwardly toward the wall of the reservoir, and having a curved fitting open in a direction opposite to that of the rotation of the shaft, and means for securing the reservoir to the shaft.

4. The combination with the casing 9, the bore of which is enlarged at its lower end, the raceway 14 seated in this enlargement, the flange 15 secured to the lower end of the casing and supporting the raceway, balls 16 working on the raceway and the inverted raceway 17 mounted on said balls, a cage supported on the raceway 17, and antifriction devices carried by the cage.

MELVILL H. BARKER.

Witnesses:
HENRY J. MILLER,
CHARLES W. WILKINS.